US011258884B1

(12) United States Patent
Reiner et al.

(10) Patent No.: US 11,258,884 B1
(45) Date of Patent: Feb. 22, 2022

(54) SECURE REMOTE ACCESS BASED ON INSPECTION AND VALIDATION OF REMOTE ACCESS PROTOCOL TRAFFIC

(71) Applicant: CyberArk Software Ltd., Petach-Tikva (IL)

(72) Inventors: Shaked Reiner, Petach-Tikva (IL); Or Ben-Porath, Petach-Tikva (IL); Asaf Hecht, Petach-Tikva (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 17/104,801

(22) Filed: Nov. 25, 2020

(51) Int. Cl.
*H04L 29/06* (2006.01)
*H04L 29/08* (2006.01)
*H04L 67/01* (2022.01)
*H04L 67/561* (2022.01)
*H04L 67/63* (2022.01)
*G06N 20/00* (2019.01)
*G06F 21/31* (2013.01)
*G06K 9/62* (2022.01)
*G06F 21/53* (2013.01)

(52) U.S. Cl.
CPC .............. *H04L 67/42* (2013.01); *G06F 21/31* (2013.01); *G06F 21/53* (2013.01); *G06K 9/6262* (2013.01); *G06N 20/00* (2019.01); *H04L 67/2804* (2013.01); *H04L 67/327* (2013.01)

(58) Field of Classification Search
CPC ... H04L 67/42; H04L 67/2804; H04L 67/327; G06N 20/00; G06F 21/31; G06F 21/53; G06K 9/6262
See application file for complete search history.

(56) References Cited

U.S. PATENT DOCUMENTS

| 9,148,428 | B1 * | 9/2015 | Banga | H04L 63/1425 |
| 9,602,553 | B2 * | 3/2017 | Wang | H04L 67/42 |
| 9,860,249 | B2 * | 1/2018 | Dulkin | H04L 63/10 |
| 9,921,860 | B1 * | 3/2018 | Banga | G06F 9/5027 |
| 10,417,454 | B1 * | 9/2019 | Marom | H04L 63/10 |
| 10,749,876 | B2 * | 8/2020 | Bendersky | G06F 21/31 |

(Continued)

OTHER PUBLICATIONS

Bai (Machine Learning Approach for RDP-based Lateral Movement Detection, UW, 2019, 57 pages) (Year: 2019).*

*Primary Examiner* — Oleg Korsak
(74) *Attorney, Agent, or Firm* — Finnegan, Henderson, Farabow, Garrett & Dunner, LLP

(57) ABSTRACT

Disclosed embodiments relate to securely inspecting and validating remote access protocol communications. Operations may include accessing remote access protocol communications between a first computing resource and a second computing resource; and validating at least a portion of the remote access protocol communications by at least one of: analyzing a sequence among the at least the portion, analyzing data contents of the at least the portion, analyzing a size field in the at least the portion, or analyzing a data-size correlation of the at least the portion; wherein at least one of the following is conditioned on a result of the validation: an ability of the at least the portion of the remote access protocol communications to pass between the first computing resource and the second computing resource, or an establishment of a remote access session between the first computing resource and the second computing resource.

20 Claims, 8 Drawing Sheets

(56) References Cited

U.S. PATENT DOCUMENTS

| | | | | |
|---|---|---|---|---|
| 2009/0006710 | A1* | 1/2009 | Daniel | G06F 9/45558 710/315 |
| 2010/0250768 | A1* | 9/2010 | Barreto | H04L 67/2876 709/231 |
| 2013/0191631 | A1* | 7/2013 | Ylonen | H04L 63/16 713/153 |
| 2017/0091467 | A1* | 3/2017 | Pogorelik | G06F 21/57 |
| 2019/0052631 | A1* | 2/2019 | Momchilov | G06F 21/83 |
| 2019/0340376 | A1* | 11/2019 | Fleck | G06F 16/27 |
| 2020/0053096 | A1* | 2/2020 | Bendersky | G06F 21/44 |
| 2020/0145385 | A1* | 5/2020 | Chauhan | H04L 63/0281 |
| 2020/0151617 | A1* | 5/2020 | Chauhan | H04L 67/22 |
| 2020/0153711 | A1* | 5/2020 | Chauhan | G06N 20/00 |
| 2020/0153911 | A1* | 5/2020 | Chauhan | G06F 21/6218 |
| 2020/0374372 | A1* | 11/2020 | Le Strat | H04L 67/141 |

* cited by examiner

SECURE REMOTE ACCESS BASED ON INSPECTION AND VALIDATION OF REMOTE ACCESS PROTOCOL TRAFFIC

BACKGROUND

Remote Desktop Protocol (RDP) is a protocol developed to provide a user with a graphical interface to connect to another computer. RDP is complex and prone to vulnerabilities. RDP also operates over a network, giving malicious attackers opportunities to exploit possible vulnerabilities remotely and gain unauthorized access to various resources.

Some security solutions have been used to help increase the security of RDP. One type of security solution (e.g., Intrusion Detection Systems (IDS) or Intrusion Prevention Systems (IPS)) may attempt to detect or block unwanted behaviors (e.g., malware operations or exploitation attempts) at the network level. Such security solutions may use signatures to help detect known threats and exploitations. Another type of security solution may attempt to detect or block exploitation attempts using heuristics. Such security solutions may detect common techniques used in the exploitation processes, including, e.g., stack pivoting, executable page allocation, return-oriented programming, and the like.

These security solutions, however, are insufficient because they require prior knowledge of the protocol's vulnerabilities. In other words, these security solutions are not able to protect the protocol against new security threats. Also, these security solutions are generic and are not tailored to the specific protocol that needs protection. A generic security solution, for example, may not be able to protect the unique features of protocols such as RDP and the like.

There are thus needs for technological solutions for securely inspecting and validating protocols such as RDP and the like. Further technical improvements are described in the example embodiments below.

SUMMARY

The embodiments described below relate to securely inspecting and validating remote access protocol communications. For example, in an example embodiment there may be a non-transitory computer readable medium including instructions that, when executed by at least one processor, cause the at least one processor to perform operations for securely inspecting and validating remote access protocol communications. The operations may include accessing remote access protocol communications between a first computing resource and a second computing resource; and validating at least a portion of the remote access protocol communications by at least one of: analyzing a sequence among the at least the portion of the remote access protocol communications, analyzing data contents of the at least the portion of the remote access protocol communications, analyzing a size field in the at least the portion of the remote access protocol communications, or analyzing a data-size correlation of the at least the portion of the remote access protocol communications; and wherein at least one of the following is conditioned on a result of the validation: an ability of the at least the portion of the remote access protocol communications to pass between the first computing resource and the second computing resource, or an establishment of a remote access session between the first computing resource and the second computing resource.

According to some embodiments, the validating further includes selecting a validation algorithm from among a plurality of validation algorithms.

According to some embodiments, the selection of the validation algorithm is based on a communication channel used by the at least the portion of the remote access protocol communications.

According to some embodiments, the operations further include intercepting the at least the portion of the remote access protocol communications.

According to some embodiments, the intercepting takes place at a proxy between the first computing resource and the second computing resource.

According to some embodiments, the at least the portion of the remote access protocol communications are received based on a network traffic mirroring operation.

According to some embodiments, the validating occurs in an offline mode based on a stored copy of the at least the portion of the remote access protocol communications.

According to some embodiments, the validating the at least the portion of the remote access protocol communications is performed by the analyzing the sequence among the at least the portion of the remote access protocol communications, and the sequence is based on an order and a type of the at least the portion of the remote access protocol communications.

According to some embodiments, the validating the at least the portion of the remote access protocol communications is performed by the analyzing data contents of the at least the portion of the remote access protocol communications, and the analyzing further includes comparing the data contents to one or more protocol definitions associated with the remote access protocol communications.

According to some embodiments, the validating the at least the portion of the remote access protocol communications is performed by the analyzing the size field in the at least the portion of the remote access protocol communications, and the size field has a corresponding maximum size parameter.

According to some embodiments, the validating the at least the portion of the remote access protocol communications is performed by the analyzing the data-size correlation of the at least the portion of the remote access protocol communications by comparing a size of the data contents of the at least the portion of the remote access protocol communications with the size field in the at least the portion of the remote access protocol communications.

Additional embodiments relate to a computer-implemented method for securely inspecting and validating remote access protocol communications. The method may include accessing remote access protocol communications between a first computing resource and a second computing resource; and validating at least a portion of the remote access protocol communications by at least one of: analyzing a sequence among the at least the portion of the remote access protocol communications, analyzing data contents of the at least the portion of the remote access protocol communications, analyzing a size field in the at least the portion of the remote access protocol communications, or analyzing a data-size correlation of the at least the portion of the remote access protocol communications; and wherein at least one of the following is conditioned on a result of the validation: an ability of the at least the portion of the remote access protocol communications to pass between the first computing resource and the second computing resource, or an establishment of a remote access session between the first computing resource and the second computing resource.

According to some embodiments, the validating is based on a machine-learning algorithm.

According to some embodiments, the method further includes feeding a result of the validating back to the machine-learning algorithm.

According to some embodiments, the method further includes updating the machine-learning algorithm based on the result of the validating.

According to some embodiments, the method further includes repeating the validating based on the updated machine-learning algorithm.

According to some embodiments, the validating is based on a supporting fuzzing system.

According to some embodiments, the validating is performed in a sandboxed environment based on replicated instances of the first computing resource and the second computing resource.

According to some embodiments, at least one of the first computing resource or the second computing resource includes an administrator computing resource.

According to some embodiments, at least one of the first computing resource or the second computing resource includes an IoT computing resource.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques of securely inspecting and validating remote access protocol communications addressed herein overcome several important technical problems in the fields of data security and network communications. Rather than relying on prior knowledge of a protocol's vulnerabilities, the techniques discussed below allow a system to validate the protocol itself. For example, the system may utilize a validator to validate at least a portion of protocol communications (i.e., communications carried out in accordance with the protocol). The system may then determine whether to establish a communication session between computing resources, and/or whether to allow the protocol communications to pass between the computing resources, in response to the result of the validation. In this manner, the security of the system can be improved without requiring the validator to have any prior knowledge of the protocol's vulnerabilities.

Reference will now be made in detail to the disclosed embodiments, examples of which are illustrated in the accompanying drawings.

Figure 1:
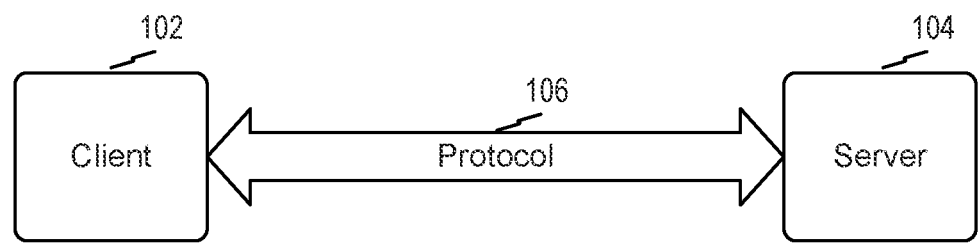
FIG. 1 is a block diagram of an exemplary system that implements a remote access communication protocol in accordance with disclosed embodiments.

FIG. 1 is a block diagram of an example system 100 that implements a communication protocol. As shown, system 100 includes a first computing resource (e.g., client) 102, which may include one or more computing devices operated by one or more users (e.g., individuals, organizations, etc.). System 100 also includes a second computing resource (e.g., server) 104, which may include one or more computing devices operated by one or more users (e.g., individuals, organizations, etc.). In some embodiments, first computing resource 102 may be a requester of a resource or service, and may be referred to as a client. In some embodiments, second computing resource 104 may be a provider of a resource or service, and may be referred to as a server.

In some embodiments, the computing devices 102/104 may include a handheld device (e.g., a mobile phone, a tablet, or a notebook), a wearable device (e.g., a smart watch, smart jewelry, an implantable device, a fitness tracker, smart clothing, a head-mounted display, etc.), an IoT device (e.g., smart home device, industrial device, etc.), personal computer (e.g., a desktop or laptop), or various other devices capable of processing and/or receiving data. Exemplary components of the computing devices 102/104 are discussed in connection with FIG. 2, which illustrates a block diagram of an exemplary computing device 200 in accordance with disclosed embodiments.

Figure 2:
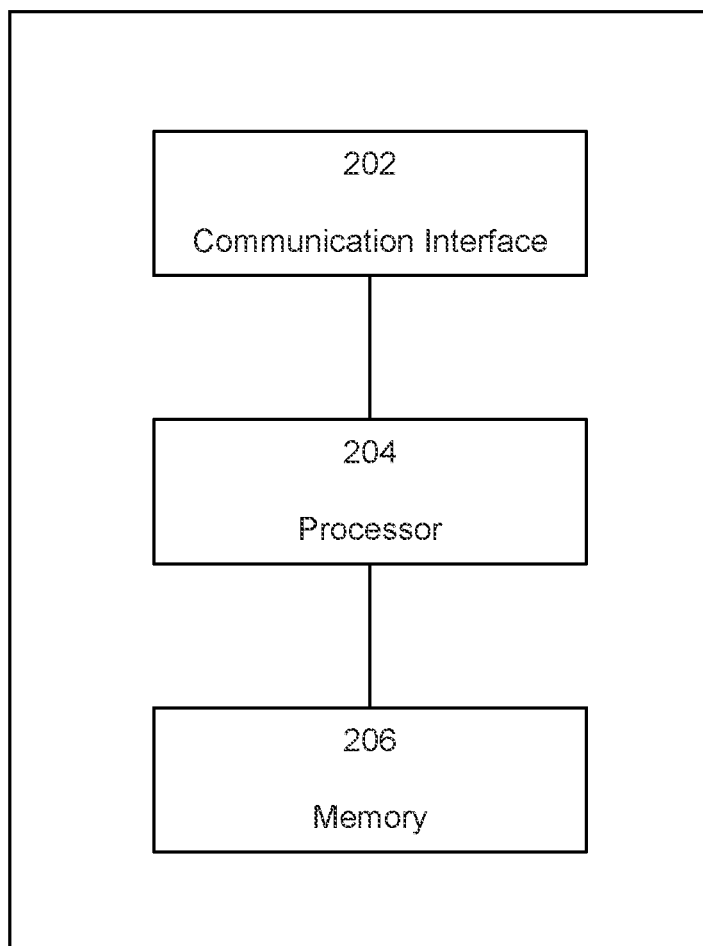
FIG. 2 is a block diagram of an example computing device in accordance with disclosed embodiments.

As shown in FIG. 2, computing device 200 may include a communication interface 202, a processor 204, and a memory 206, among potentially various other components. The communication interface 202 may facilitate communications between computing device 200 and other computing devices or resources. In some embodiments, communication interface 202 may be configured to support one or more communication standards, such as an Internet standard or protocol, an Integrated Services Digital Network (ISDN) standard, and the like. In some embodiments, communication interface 202 may include one or more of a LAN card, a cable modem, a satellite modem, a data bus, a cable, a wireless communication channel, a radio-based communication channel, a cellular communication channel, an Internet Protocol, a SSH, a HTTP, or a REST based communication device, or other communication devices for wired and/or wireless communications. In some embodiments, communication interface 202 may be based on public cloud infrastructure, private cloud infrastructure, or hybrid public/private cloud infrastructure.

Processor 204 may include one or more dedicated processing units, application-specific integrated circuits (ASICs), field-programmable gate arrays (FPGAs), or various other types of processors or processing units. Processor 204 may be coupled with memory 206 and configured to execute instructions stored in memory 206.

Memory 206 may store processor-executable instructions and data. Memory 206 may include any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk.

Referring now back to FIG. 1. In some embodiments, first computing resource 102 may be in communication with second computing resource 104 via a communication channel 106. Communication channel 106 may include a bus, a cable, a wireless communication channel, a radio-based communication channel, the Internet, a local area network (LAN), a wireless local area network (WLAN), a wide area network (WAN), a cellular communication network, or any Internet Protocol (IP), Secure Shell (SSH), Hypertext Transfer Protocol (HTTP), or Representational State Transfer (REST) based communication network and the like. In some embodiments, communication channel 106 may be based on public cloud infrastructure, private cloud infrastructure, hybrid public/private cloud infrastructure, or no cloud infrastructure. In such differing embodiments, first computing resource 102 and second computing resource 104 may each be in the same, or in different, networks or network segments.

In some embodiments, first computing resource 102 may communicate with second computing resource 104 in accordance with a particular communication protocol. For example, in some embodiments, first computing resource 102 may establish a communication session and communicate with second computing resource 104 in accordance with the Remote Desktop Protocol (RDP). In some embodiments, one of first computing resource 102 or second computing resource 104 may be an administrator, and the administrator may use an RDP session to access the other computing resource. In some embodiments, at least one of first computing resource 102 or second computing resource 104 may include an IoT computing resource.

Consistent with below embodiments, protocols other than RDP may be used as well. For example, the communications may comply with a different remote access protocol, such as Independent Computing Architecture (ICA), remote framebuffer (RFB), Google™ Chromoting, Adaptive Internet Protocol (AIP), Simple Protocol for Independent Computing Environments (SPICE), or various other standardized or proprietary protocols.

For illustrative purposes, first computing resource 102 and second computing resource 104 may be referred to as "consumers" of the protocol they implement. Being a consumer of a protocol may expose that consumer to certain vulnerabilities associated with the protocol. For example, if an attacker can exploit the vulnerabilities of the protocol and send a malformed data to one of the consumers, e.g., first computing resource 102, then the attacker can define the malformed data in a manner so that the receiving consumer, e.g., first computing resource 102, may have difficulties processing the malformed data. In some instances, the attacker may define the malformed data to cause the receiving consumer to alter its behavior and/or execute malicious code.

Figure 3:
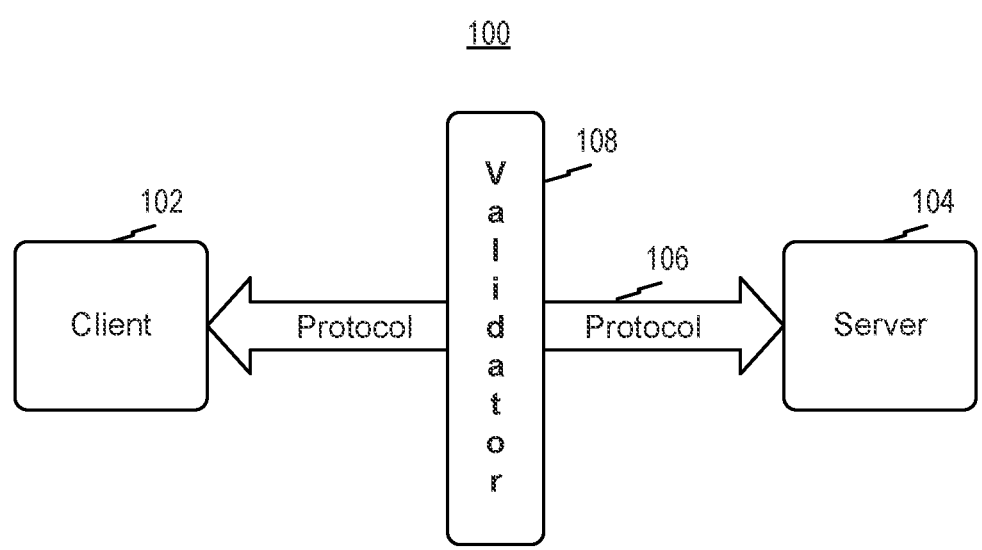
FIG. 3 is a block diagram of an exemplary system for securely inspecting and validating remote access protocol communications in accordance with disclosed embodiments.

FIG. 3 is a block diagram of system 100 that further includes a validator 108 in accordance with disclosed embodiments. In some embodiments, validator 108 may be implemented using one or more computing devices, and in some embodiments, validator 108 may be configured to validate at least a portion of the protocol communications (i.e., communications carried out in accordance with the protocol). In some embodiments, validator 108 may validate the protocol communications before the protocol communications are delivered to the receiving consumer. In some embodiments, if the protocol communications cannot be validated, validator 108 may identify and/or report the protocol communications as being suspicious. Additionally, or alternatively, validator 108 may block or otherwise prevent the protocol communications from being delivered to the receiving consumer, effectively mitigating the risk of compromising the receiving consumer. Additionally, or alternatively, validator 108 may terminate the session established in accordance with the protocol between first computing resource 102 and second computing resource 104.

In some embodiments, validator 108 may select a validation algorithm from multiple validation algorithms to validate the protocol communications. For example, in some embodiments, validator 108 may select a validation algorithm that validates at least a portion of the protocol communications based on the flow of messages. Validator 108 may analyze a sequence among the portion of the protocol communications and determine whether the sequence is appropriate. In some embodiments, the sequence may be based on an order and a type of the portion of the protocol communications. For example, if the protocol requires certain types of messages to be sent before other types of messages, then a sequence that contains messages sent in a different order may be deemed invalid. In another example, if a particular type of message can only be sent from a client to a server, then a sequence sent to a client may be deemed invalid if it contains that particular type of message.

In some embodiments, validator 108 may select a validation algorithm that validates at least a portion of the protocol communications based on the data contents of the protocol communications. For example, in some embodiments, validator 108 may compare the data contents to one or more protocol definitions associated with the protocol and determine whether the data contents violate any protocol definitions. For example, if the protocol specifies a size field and the data contents contained in the protocol communications exceed the specified size, then the protocol communications may be deemed invalid. In another example, if the protocol supports certain flag fields, then protocol communications containing data contents that attempt to set an unsupported flag may be deemed invalid.

In some embodiments, validator 108 may select a validation algorithm that validates at least a portion of the protocol communications based on the size of the actual data being sent. For example, if the protocol specifies a maximum size allowed for a particular type of message, then a message that exceeds the specified maximum size may be deemed invalid. In another example, validator 108 may analyze a size field in the portion of the protocol communications (e.g., certain types of messages may specify a maximum size of the data being sent). If the size of the actual data being sent exceeds a corresponding maximum size parameter specified in the size field, then the portion of the protocol communications being sent may be deemed invalid.

In some embodiments, validator 108 may select a validation algorithm that validates at least a portion of the protocol communications based on a data-size correlation. For example, validator 108 may analyze the data-size correlation of the portion of the protocol communications by comparing the size of the data contents of the portion of the protocol communications with the size field in the portion of the protocol communications (e.g., certain types of messages may specify the size of the data being sent in the message header). If the size of the data contents does not match (or is otherwise inconsistent with) the data size specified in the message header, then the portion of the protocol communications may be deemed invalid.

In some embodiments, validator 108 may also implement one or more machine-learning algorithms to further enhance its operations. For example, validator 108 may implement one or more machine-learning algorithms to learn how a legitimate communication session established in accordance with the protocol should behave. Validator 108 may also implement one or more machine-learning algorithms to learn how to identify malicious communications. In some embodiments, a set of valid training communications and a set of invalid training communications may be used to train the one or more machine-learning algorithms. In some embodiments, validator 108 may feed the result of the validation to the machine-learning algorithm. For example, validator 108 may add one or more valid protocol communications to the set of valid training communications and add one or more invalid protocol communications to the set of invalid training communications. In this manner, the machine-learning algorithm may be updated based on the result of the validation, and the updated machine-learning algorithm may be utilized by validator 108 to enhance its operations. Consistent with below embodiments, the machine learning may be based on techniques such as decision trees, classification algorithms, regression, or others.

In some embodiments, validator 108 may further implement a supporting fuzzing system, which may provide a dedicated fuzzing environment that can be used to detect new bugs or vulnerabilities in the protocol. In some embodiments, the supporting fuzzing environment may generate invalid, unexpected, or random data as test communications to test the protocol. The supporting fuzzing system may then feed its detections to validator 108 to further enhance the operations of validator 108. For example, if the supporting fuzzing environment determines that a particular flow of message or a particular data format may cause the receiving consumer to misbehave and/or execute malicious code, the supporting fuzzing environment may provide that information to validator 108, which may then identify a protocol communication having the same flow or the same data format as being invalid. Consistent with the embodiments here, the fuzzing may be implemented according to a variety of techniques, such as generation-based or mutation-based fuzzing. The fuzzer may be a black-box fuzzer, white-box fuzzer, gray-box fuzzer, or the like.

In some embodiments, validator 108 may further implement a sandboxed environment based on replicated instances of one or more consumers of the protocol. For example, validator 108 may implement a dedicated sandboxed environment based on replicated instances of first computing resource 102 and second computing resource 104. In some embodiments, the sandboxed environment may replicate every protocol connection that can go through system 100 to check for any unwanted behaviors on either the client 102 or the server 104 side.

Figure 4:
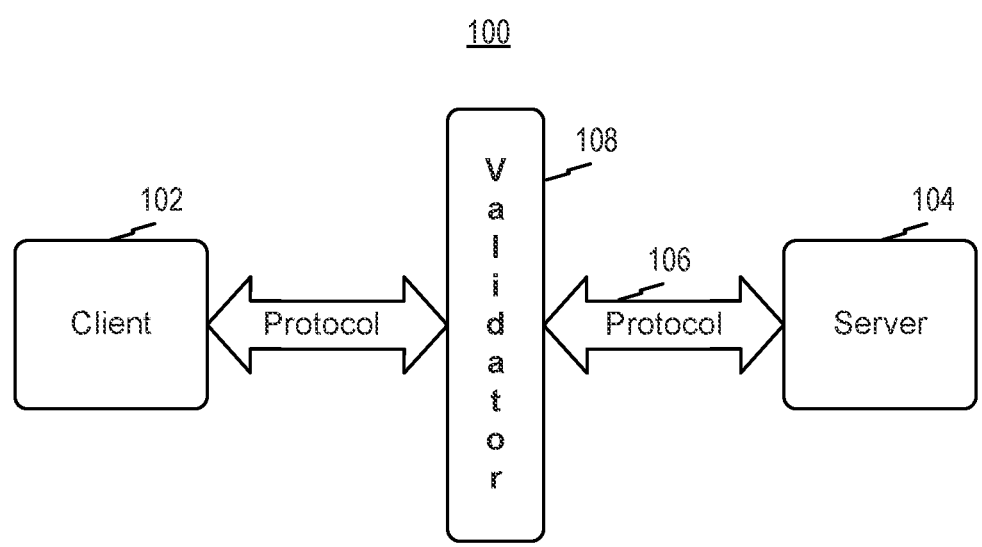
FIG. 4 is a block diagram of an exemplary system for securely inspecting and validating remote access protocol communications in accordance with disclosed embodiments.

Referring now to FIG. 4, a block diagram depicting system 100 that utilizes a validator 108 implemented as a network proxy is shown. As shown in FIG. 4, validator 108 may be positioned between first computing resource 102 and second computing resource 104, and in some embodiments, validator 108 may be configured to intercept at least a portion of protocol communications between first computing resource 102 and second computing resource 104 in real-time. In some embodiments, validator 108 may be equipped to decrypt all layers of encryptions (including, e.g., encryptions based on Transport Layer Security (TLS), Kerberos encryption, CredSSP encryption, RC4 encryption, etc.) applied to the intercepted protocol communications. In some embodiments, the appropriate keys needed to decrypt the intercepted protocol communications may be made available to validator 108 so that validator 108 can have access to the actual data being transferred between first computing resource 102 and second computing resource 104.

In some embodiments, first computing resource 102 and second computing resource 104 may establish one or more communication channels. In such embodiments, validator 108 may identify the one or more communication channels and analyze at least a portion of the protocol communications carried out on each of the identified communication channels. In some embodiments, validator 108 may inspect every message communicated on the identified communication channels. Alternatively, in some embodiments, validator 108 may inspect a subset of messages communicated on a subset of communication channels.

Figure 5:
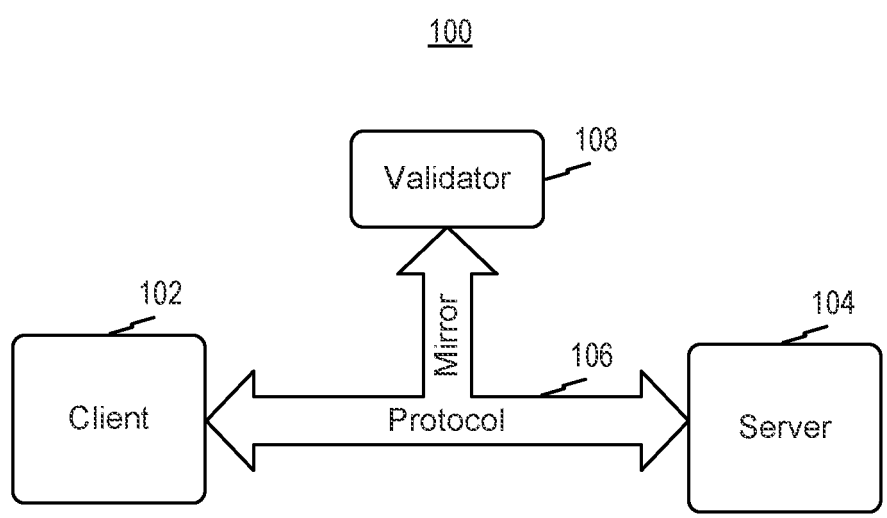
FIG. 5 is a block diagram of an exemplary system for securely inspecting and validating remote access protocol communications in accordance with disclosed embodiments.

In some embodiments, system 100 may implement validator 108 using various other techniques. For example, as shown in FIG. 5, instead of positioning validator 108 between first computing resource 102 and second computing resource 104, system 100 may utilize one or more network mirrors to make at least a portion of the protocol communications between first computing resource 102 and second computing resource 104 visible to validator 108. In some embodiments, validator 108 may analyze the mirrored communications in real-time. Alternatively, the mirrored communications may be stored in a data storage device, allowing validator 108 to analyze a stored copy of the mirrored communications to detect and identify exploitation attempts offline instead of in real-time.

Figure 6:
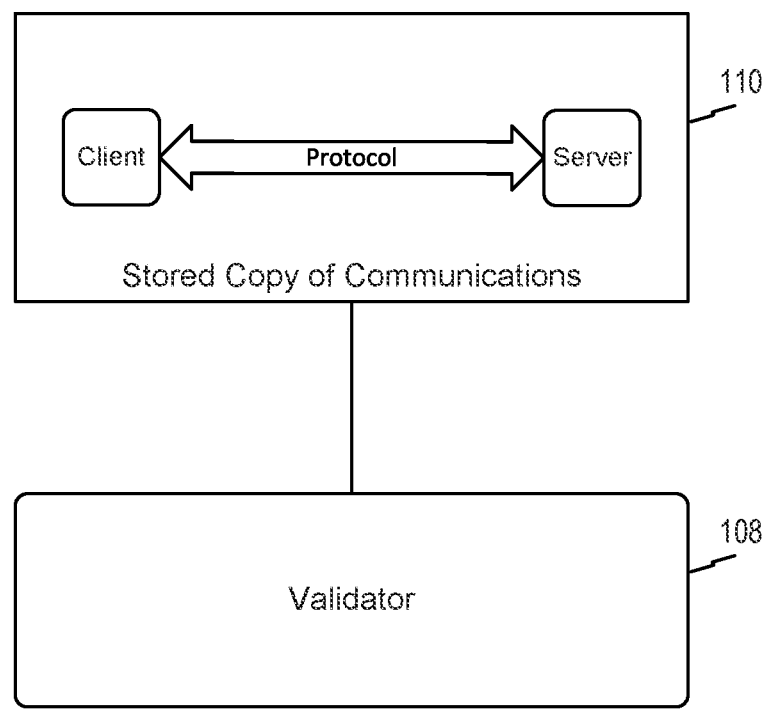
FIG. 6 is a block diagram of an exemplary validator for securely inspecting and validating remote access protocol communications in accordance with disclosed embodiments.

FIG. 6 is a block diagram of a validator 108 configured to take a stored copy of mirrored communications as input 110 and perform the validation based on the input offline. In some embodiments, a validator 108 capable of performing the validation offline may also be used to implement the sandboxed environment described above.

Figure 7:
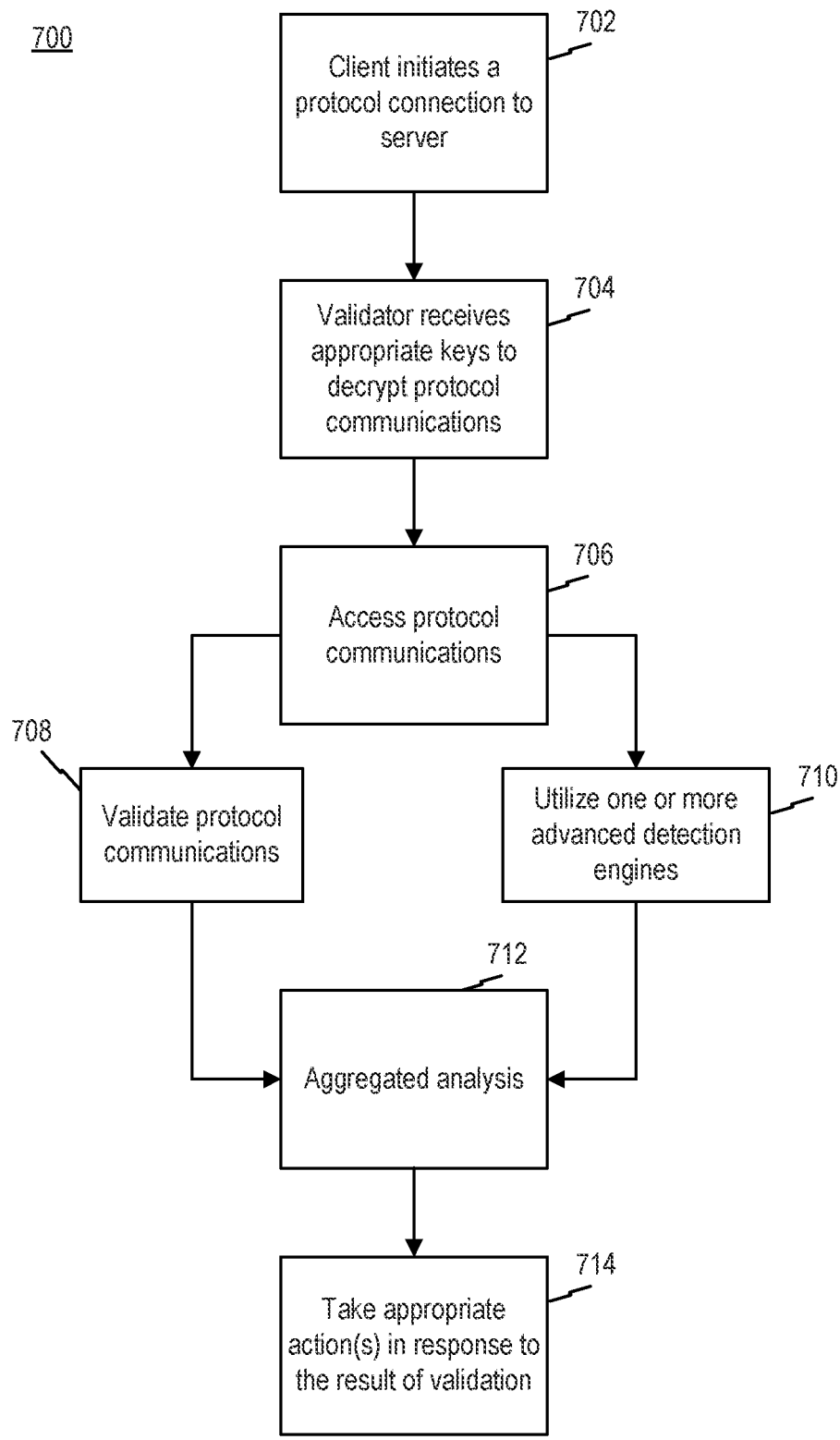
FIG. 7 is an exemplary flowchart showing a process for securely inspecting and validating remote access protocol communications in accordance with disclosed embodiments.

Referring now to FIG. 7, an exemplary flowchart showing a process 700 for securely inspecting and validating protocol communications (including, e.g., remote access protocol communications) is shown. In accordance with above embodiments, process 700 may be implemented in system 100 depicted in FIG. 3. For example, process 700 may be performed by one or more computing devices implementing first computing resource 102, second computing resource 104, and validator 108.

At step 702, a client (e.g., first computing resource 102) may initiate a protocol connection to a server (e.g., second computing resource 104). In some embodiments, the protocol may be a remote access protocol such as the Remote Desktop Protocol (RDP) or the like. Of course, in other embodiments the communications may comply with a different remote access protocol, such as Independent Computing Architecture (ICA), remote framebuffer (RFB), Google™ Chromoting, Adaptive Internet Protocol (AIP), Simple Protocol for Independent Computing Environments (SPICE), or various other standardized or proprietary protocols.

At step 704, a validator (e.g., validator 108) may receive appropriate keys needed to decrypt protocol communications. For example, in some embodiments, the appropriate keys may be obtained or captured from the initial protocol communication. In some embodiments, the keys may be obtained locally (e.g., accessed from local memory or generated). Alternatively, the keys may be received from an external resource. Consistent with below embodiments, the keys may be symmetric or asymmetric (e.g., a public/private key pair).

At step 706, the validator may access at least a portion of the protocol communications between the client 102 and the server 104. As described above, in some embodiments, the validator 108 may intercept the protocol communications in real-time. In some embodiments, the validator 108 may receive the protocol communications based on a network traffic mirroring operation. In some embodiments, the validator 108 may operate in an offline mode based on a stored copy of the protocol communications.

At step 708, the validator may validate the protocol communications. In some embodiments, the validator 108 may select a validation algorithm from multiple validation algorithms. In some embodiments, the selection of the validation algorithm may be based on a communication channel used by the at least the portion of the remote access protocol communications. For example, in some embodiments, the validator 108 may select a validation algorithm that validates the protocol communications based on the flow of messages. In another example, the validator 108 may select a validation algorithm that validates the protocol communications based on the data contents. In yet another example, the validator 108 may select a validation algorithm that validates the protocol communications based on the size of the actual data being sent. In still another example, the validator 108 may select a validation algorithm that validates the protocol communications based on a data-size correlation. In some embodiments, the validator 108 may select a validation algorithm for every channel (e.g., video channel, input channel, etc.) established to carry out the remote access protocol communications. In such embodiments, the validator 108 may select the validation algorithms based on the actual channels used in a connection that is being validated. In this manner, the validator 108 may validate the protocol communications based on, e.g., (a) the flow of messages, the data contents, and the size of the data sent through a video channel and/or (b) the flow of messages, the data contents, and the size of the data sent through an input channel, and so on. In other words, the validator 108 may select validation algorithms between different types of channels (e.g., between the input channel and the video channel), depending on which channel is used in the connection.

At step 710, the validator may have the option to utilize one or more advanced detection engines to further enhance its operations. For example, in some embodiments, the validator 108 may implement one or more machine-learning algorithms as described above. In another example, the validator 108 may implement a supporting fuzzing system described above. In still another example, the validator 108 may implement a sandboxed environment based on replicated instances of one or more consumers of the protocol described above.

At step 712, the validator may aggregate the results of step 708 and 710 (if the validator exercised the option to invoke step 710). For example, the validator 108 may feed the result obtained from step 708 to a machine-learning algorithm. The machine-learning algorithm may be updated based on the result provided, and the updated machine-learning algorithm may be utilized by the validator 108 to enhance its operations. In another example, the validator 108 may use a dedicated fuzzing environment to detect new bugs or vulnerabilities in the protocol, and the validator 108 may take the newly detected bugs or vulnerabilities into account to determine the validity of the remote access protocol communications.

At step 714, the validator may indicate the action to be taken in response to the result of the validation. For example, if there is no communication session established in accordance with the protocol between the client and the server, the validator 108 may indicate whether or not the session can be established based on whether or not the result of the validation is successful. In some embodiments, the session may be established only if the validation is successful. In another example, if the communication session has already been established between the client 102 and the server 104, the validator 108 may indicate whether to maintain or terminate the session based on whether or not the result of the validation is successful. In some embodiments, the session may be terminated if the validation is unsuccessful. In still another example, the validator 108 may indicate whether to allow the protocol communications to pass between the client 102 and the server 104 based on whether or not the result of the validation is successful. In some embodiments, the protocol communications may pass between the client 102 and the server 104 only if the validation is successful.

Figure 8:
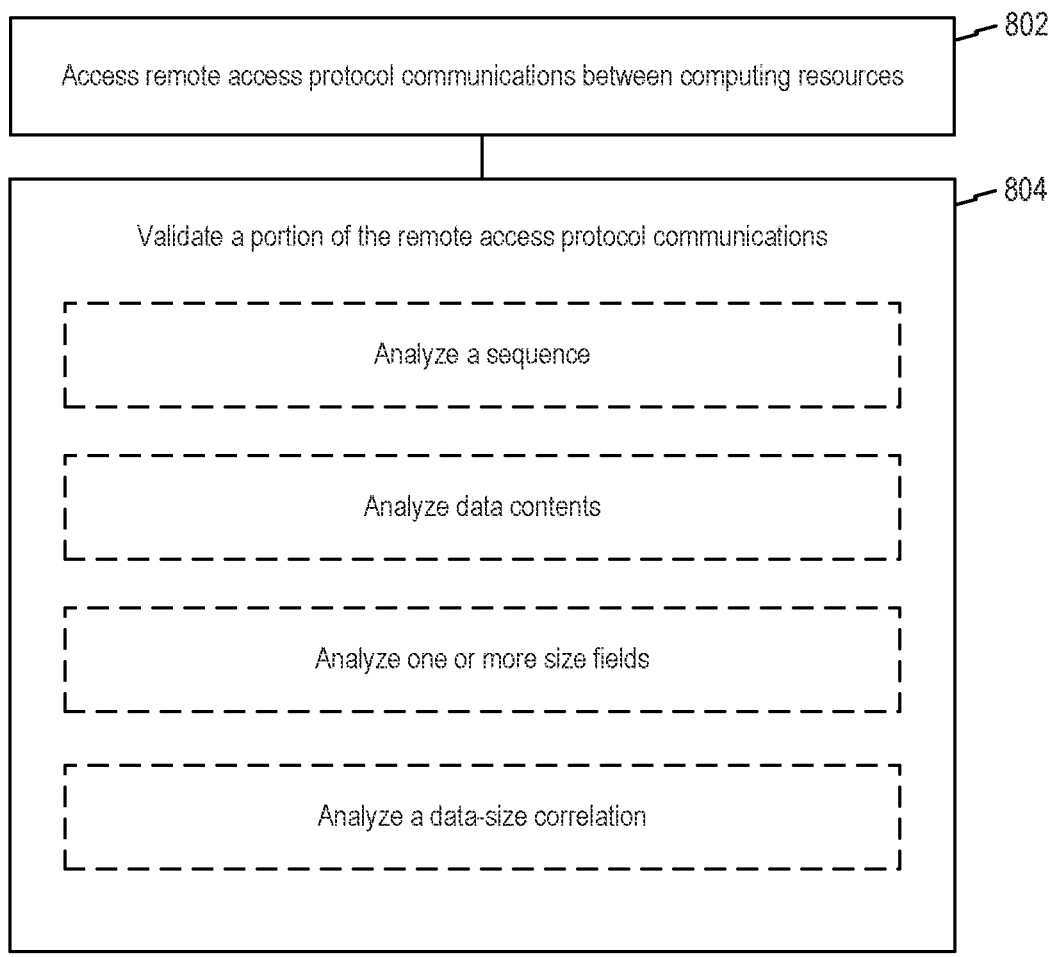
FIG. 8 is an exemplary flowchart showing a process for securely inspecting and validating remote access protocol communications in accordance with disclosed embodiments.

Referring now to FIG. 8, an exemplary flowchart showing a process 800 for securely inspecting and validating remote access protocol communications is shown. In accordance with above embodiments, process 800 may be implemented in system 100 depicted in FIG. 3. For example, process 800 may be performed by one or more computing devices that implement validator 108.

At step 802, process 800 may access remote access protocol communications between a first computing resource (e.g., first computing resource 102 shown in FIG. 3) and a second computing resource (e.g., second computing resource 104 shown in FIG. 3). In some embodiments, process 800 may intercept at least a portion of the remote access protocol communications, and in some embodiments, the interception may take place at a proxy between the first computing resource and the second computing resource. In some embodiments, process 800 may receive the at least the portion of the remote access protocol communications based on a network traffic mirroring operation. In some embodiments, process 800 may access a stored copy of the at least the portion of the remote access protocol communications.

At step 804, process 800 may validate the at least the portion of the remote access protocol communications. In some embodiments, process 800 may select a validation algorithm from among a plurality of validation algorithms. In some embodiments, the selection of the validation algorithm may be based on a communication channel used by the at least the portion of the remote access protocol communications, consistent with the discussion above.

In some embodiments, process 800 may validate the at least the portion of the remote access protocol communications by analyzing a sequence among the at least the portion of the remote access protocol communications. As described above, in some embodiments, the sequence may be based on an order and a type of the at least the portion of the remote access protocol communications.

In some embodiments, process 800 may validate the at least the portion of the remote access protocol communications by analyzing data contents of the at least the portion of the remote access protocol communications. As described above, in some embodiments, the analysis may further include comparing the data contents to one or more protocol definitions associated with the remote access protocol communications.

In some embodiments, process 800 may validate the at least the portion of the remote access protocol communications by analyzing one or more size fields in the at least the portion of the remote access protocol communications. As described above, in some embodiments, a size field may have a corresponding maximum size parameter.

In some embodiments, process 800 may validate the at least the portion of the remote access protocol communications by analyzing a data-size correlation of the at least the portion of the remote access protocol communications. As described above, in some embodiments, process 800 may analyze the data-size correlation by comparing a size of the data contents of the at least the portion of the remote access protocol communications with the size field in the at least the portion of the remote access protocol communications.

In some embodiments, process 800 may access a stored copy of the at least the portion of the remote access protocol communications and validate the stored copy of the at least the portion of the remote access protocol communications in an offline mode.

In some embodiments, process 800 may provide the result of the validation as a condition for carrying out additional actions with respect to the remote access protocol communications. For example, in some embodiments, the ability of the at least the portion of the remote access protocol communications to pass between the first computing resource 102 and the second computing resource 104 may be conditioned on the result of the validation. In some embodiments, the at least the portion of the remote access protocol communications may pass between the first computing resource 102 and the second computing resource 104 only if the validation is successful. In some embodiments, the establishment of a remote access session between the first computing resource and the second computing resource may be conditioned on the result of the validation. In some embodiments, the session may be established only if the validation is successful.

In some embodiments, process 800 may validate the at least the portion of the remote access protocol communications based on a machine-learning algorithm described above. In some embodiments, process 800 may feed a result of the validation back to the machine-learning algorithm. In some embodiments, process 800 may update the machine-learning algorithm based on the result of the validation. Furthermore, in some embodiments, process 800 may repeat the validating step 804 based on the updated machine-learning algorithm.

In some embodiments, process 800 may validate the at least the portion of the remote access protocol communications based on a supporting fuzzing system described above. In some embodiments, the supporting fuzzing system may provide a dedicated fuzzing environment that can be used to detect new bugs or vulnerabilities in the remote access protocol. The supporting fuzzing system may then feed its detections to process 800 to further enhance the operations of process 800.

In some embodiments, process 800 may validate the at least the portion of the remote access protocol communications in a sandboxed environment described above. In some embodiments, the sandboxed environment may be based on replicated instances of the first computing resource and the second computing resource.

In some embodiments, at least one of the first computing resource or the second computing resource may include an administrator computing resource. In some embodiments, at least one of the first computing resource or the second computing resource may include an IoT computing resource.

It is to be understood that the references to the remote access protocol described above are presented as examples and are not meant to be limiting. It is contemplated that system 100, validator 108, process 700, and process 800 may be configured to inspect and validate communications carried out in accordance with various types of network protocols (including encrypted and non-encrypted communication protocols) without departing from the spirit and scope of the present disclosure. It is also to be understood that the references to two computing resources, a client and a server, described in the examples above are not meant to be limiting. It is contemplated that system 100, validator 108, process 700, and process 800 may be configured to inspect and validate communications carried out amongst various computing resources without departing from the spirit and scope of the present disclosure.

Furthermore, it is to be understood that while some embodiments described above provided appropriate keys to the validator (e.g., validator 108) so that the validator can decrypt and validate the protocol communications, such embodiments are described as examples and are not meant to be limiting. In some embodiments, the protocol may be a non-encrypted protocol, in which case the validator may validate the protocol communications without needing to decrypt the protocol communications. In another example, the protocol may be defined to operate with homomorphic encryption, in which case the validator may operate directly on encrypted data without needing to decrypt the protocol communications. In still another example, a homomorphic encryption layer may be used to override the existing encryption layer associated with the protocol, in which case the protocol may function as if it was defined to operate with the homomorphic encryption layer, allowing the validator to operate on encrypted data without needing to decrypt the protocol communications.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of the these terms is intended to include all such new technologies a priori.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for securely inspecting and validating remote access protocol communications of connection initiation, the operations comprising:
   accessing remote access protocol communications of connection initiation between a first computing resource and a second computing resource; and
   validating for protocol discrepancies at least a portion of the remote access protocol communications by at least one of:
      analyzing a sequence among the at least the portion of the remote access protocol communications to determine whether the sequence is appropriate,
      analyzing data contents of the at least the portion of the remote access protocol communications to determine whether the data contents violate any protocol definitions,
      analyzing a size field in the at least the portion of the remote access protocol communications to determine whether the portion of the remote access protocol communications is invalid for exceeding a specified size, or
      analyzing a data-size correlation of the at least the portion of the remote access protocol communications to determine whether the portion of the remote access protocol communications is invalid for having a data size that is inconsistent with a specified data size; and
   wherein at least one of the following is conditioned on a result of the validation: an ability of a portion of the remote access protocol communications to pass between the first computing resource and the second computing resource, or an establishment of a remote access session between the first computing resource and the second computing resource.

2. The non-transitory computer readable medium of claim 1, wherein the validating for protocol discrepancies further comprises selecting a validation algorithm from among a plurality of validation algorithms.

3. The non-transitory computer readable medium of claim 2, wherein the selection of the validation algorithm is based on a communication channel used by the at least the portion of the remote access protocol communications.

4. The non-transitory computer readable medium of claim 1, wherein the operations further comprise intercepting the at least the portion of the remote access protocol communications.

5. The non-transitory computer readable medium of claim 4, wherein the intercepting takes place at a proxy between the first computing resource and the second computing resource.

6. The non-transitory computer readable medium of claim 1, wherein the at least the portion of the remote access protocol communications are received based on a network traffic mirroring operation.

7. The non-transitory computer readable medium of claim 1, wherein the validating for protocol discrepancies occurs in an offline mode based on a stored copy of the at least the portion of the remote access protocol communications.

8. The non-transitory computer readable medium of claim 1, wherein the validating for protocol discrepancies the at least the portion of the remote access protocol communications is performed by the analyzing the sequence among the at least the portion of the remote access protocol communications, and the sequence is based on an order and a type of the at least the portion of the remote access protocol communications.

9. The non-transitory computer readable medium of claim 1, wherein the validating for protocol discrepancies the at least the portion of the remote access protocol communications is performed by the analyzing data contents of the at least the portion of the remote access protocol communications, and the analyzing further includes comparing the data contents to one or more protocol definitions associated with the remote access protocol communications.

10. The non-transitory computer readable medium of claim 1, wherein the validating for protocol discrepancies the at least the portion of the remote access protocol communications is performed by the analyzing the size field in the at least the portion of the remote access protocol communications, and the size field has a corresponding maximum size parameter.

11. The non-transitory computer readable medium of claim 1, wherein the validating for protocol discrepancies the at least the portion of the remote access protocol communications is performed by the analyzing the data-size correlation of the at least the portion of the remote access protocol communications by comparing a size of the data contents of the at least the portion of the remote access protocol communications with the size field in the at least the portion of the remote access protocol communications.

12. A computer-implemented method for securely inspecting and validating remote access protocol communications of connection initiation, the method comprising:
   accessing remote access protocol communications of connection initiation between a first computing resource and a second computing resource; and
   validating for protocol discrepancies at least a portion of the remote access protocol communications by at least one of:
      analyzing a sequence among the at least the portion of the remote access protocol communications to determine whether the sequence is appropriate, analyzing data contents of the at least the portion of the remote access protocol communications to determine whether the data contents violate any protocol definitions, analyzing a size field in the at least the portion of the remote access protocol communications to determine whether the portion of the remote access protocol communications is invalid for exceeding a specified size, or analyzing a data-size correlation of the at least the portion of the remote access protocol communications to determine whether the portion of the remote access protocol communications is invalid for having a data size that is inconsistent with a specified data size; and wherein at least one of the following is conditioned on a result of the validation: an ability of the at least the portion of the remote access protocol communications to pass between the first computing resource and the second computing resource, or an establishment of a remote access session between the first computing resource and the second computing resource.

13. The computer-implemented method of claim 12, wherein the validating for protocol discrepancies is based on a machine-learning algorithm.

14. The computer-implemented method of claim 13, further comprising feeding a result of the validating for protocol discrepancies back to the machine-learning algorithm.

15. The computer-implemented method of claim 14, further comprising updating the machine-learning algorithm based on the result of the validating for protocol discrepancies.

16. The computer-implemented method of claim 15, further comprising repeating the validating for protocol discrepancies based on the updated machine-learning algorithm.

17. The computer-implemented method of claim 12, wherein the validating for protocol discrepancies is based on a supporting fuzzing system.

18. The computer-implemented method of claim 12, wherein the validating for protocol discrepancies is performed in a sandboxed environment based on replicated instances of the first computing resource and the second computing resource.

19. The computer-implemented method of claim 12, wherein at least one of the first computing resource or the second computing resource comprises an administrator computing resource.

20. The computer-implemented method of claim 12, wherein at least one of the first computing resource or the second computing resource comprises an IoT computing resource.

* * * * *